(12) United States Patent
Linhart et al.

(10) Patent No.: US 7,604,713 B2
(45) Date of Patent: Oct. 20, 2009

(54) METHOD FOR PRODUCING CREPED PAPER

(75) Inventors: Friedrich Linhart, Heidelberg (DE); Anton Esser, Limburgerhof (DE); Detlef Kannengiesser, Zwingenberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 387 days.

(21) Appl. No.: 11/578,153

(22) PCT Filed: May 19, 2005

(86) PCT No.: PCT/EP2005/005434

§ 371 (c)(1), (2), (4) Date: Oct. 11, 2006

(87) PCT Pub. No.: WO2005/116334

PCT Pub. Date: Dec. 8, 2005

(65) Prior Publication Data

US 2007/0204965 A1    Sep. 6, 2007

(30) Foreign Application Priority Data

May 24, 2004 (DE) .................. 10 2004 025 861

(51) Int. Cl.
*D21H 11/00* (2006.01)
(52) U.S. Cl. ................ 162/111; 162/112; 162/113; 162/168.2; 156/183; 264/283
(58) Field of Classification Search .............. 162/111, 162/112, 113, 168.2; 156/183; 264/283
See application file for complete search history.

(56) References Cited

U.S. PATENT DOCUMENTS

| 5,602,209 A | 2/1997 | Warchol et al. |
| 5,980,690 A | 11/1999 | Warchol et al. |

FOREIGN PATENT DOCUMENTS

| DE | 24 36 386 | 2/1976 |
| EP | 0 074 558 | 3/1983 |
| EP | 0 856 083 | 8/1998 |
| WO | 94 12560 | 6/1994 |
| WO | 98 50630 | 11/1998 |
| WO | 00 39396 | 7/2000 |

OTHER PUBLICATIONS

U.S. Appl. No. 11/718,158, filed Apr. 27, 2007, Esser, et al.

*Primary Examiner*—Mark Halpern
(74) *Attorney, Agent, or Firm*—Oblon, Spivak, McClelland, Maier & Neustadt, L.L.P.

(57) ABSTRACT

The process for the production of crepe paper by adhesive bonding of a paper web with the aid of an adhesive comprising
(i) polyethyleneimine having a molar mass $M_w$ of from 50 000 to 2 million,
(ii) reaction products of polyethyleneimine having a molar mass $M_w$ of from 500 to 1 million with at least one $C_{14}$- to $C_{22}$-alkyldiketene, a monocarboxylic acid, an ester of a monocarboxylic acid or an acid chloride of a monocarboxylic acid and/or
(iii) reaction products of polyalkylenepolyamines having a molar mass of from 300 to 1 million with at least one bischlorohydrogen ether or bisglycidyl ether of a polyalkylene glycol having a molecular weight $M_N$ of from 300 to 3000
to a creping cylinder, compression and removal of the crepe paper, as well as the use of the adhesives (i) to (iii) as creping assistants.

10 Claims, No Drawings

METHOD FOR PRODUCING CREPED PAPER

This application is a 371 of PCT/EP05/05434 filed on 19 May 2005.

The invention relates to a process for the production of crepe paper by adhesive bonding of a moist paper web with the aid of an organic synthetic polymer as an adhesive to the creping cylinder, compression and removal of the crepe paper from the creping cylinder.

Paper which is used for cleaning purposes or for drying off, such as hand towels, napkins, tissues, toilet paper and technical cleaning cloths, must be soft and flexible, adapt to irregularities and able to absorb liquids rapidly when placed flat. The necessary soft-ness of the paper is obtained either by the choice of suitable fibers, by treatment of the paper with mechanical means or by suitable papermaking processes.

A tried and tested mechanical means for softening paper products is creping. For this purpose, the wet paper web is placed in a large polished drying cylinder, e.g. the creping cylinder, for drying, generally in the course of the papermaking, said paper web being lightly bonded with the aid of a creping system or a mixture thereof. In modern processes, for example the TAD process (Through Air Drying), the already dry paper web is placed on the polished metal cylinder and lightly bonded by means of a creping assistant or a mixture which comprises such an assistant. At a certain point, a sharp blade edge, e.g. a scraper, is pressed against the drying cylinder. Here, the paper web is compressed, raised from the cylinder and transported further under reduced tension and with reduced speed for winding. This compression imparts transverse creases of desired size, i.e. creping, to the paper to the desired extent. This reduces the stiffness of the paper and establishes the desired softness of the paper.

The creping of paper is generally carried out in the papermaking process. However, it is also possible to crepe an already dry paper. The creping can therefore be carried out independently of the papermaking by moistening the paper, for example with an aqueous solution of a suitable adhesive.

Problem-free and optimum creping depends on various factors, such as the properties of the paper stock, for example the chemicals used therein and the surface charge of the fibers, on the surface and the temperature of the creping cylinder, on the machine speed, and on the sharpness and the feed angle of the scraper. Creping demands a very high level of experience on the part of the papermakers. In particular, it must be possible to bond the paper to the drying cylinder so that it does not fly away through centrifugal force at the high machine speeds, that it is not raised by the scraper without being compressed and on the other hand that it does not adhere too firmly to the drying cylinder and therefore cannot be removed intact and cleanly from the cylinder by the scraper. In addition, the adhesive must not form any hard, brittle and firmly adhering deposit which impairs the smoothness of the polished cylinder and leaves marks on the paper. The deposit should be flexible, should be substantially dislodged with the paper and should be constantly regenerated. In order to be able to master this balancing act, the papermakers use adhesives and adhesive mixtures which are frequently also combined with release agents.

Examples of known adhesives which are applied to the drying cylinder or to the paper web and which, if appropriate, also comprise other adhesives, anchoring agents or release agents are polyvinyl alcohols, copolymers of ethylene and vinyl acetate, polyvinyl acetate, polyacrylates and heat-curable, cationic polyamidoamine resins. The last-mentioned resins are heat-curable condensates of a polyamidoamine and epichlorohydrin, which also comprise reactive groups which crosslink at relatively high temperatures, for example on heating. Such resins are used, for example, as wet-strength agents in the production of tissue paper. However, owing to their reactivity, they cannot easily be handled as creping assistants because the polymer coating on the creping cylinder is frequently irregular, hard and brittle so that production and quality problems occur during papermaking. Since the wet-strength resins have a relatively high concentration of chloride ions, a considerable corrosion of the creping cylinder can occur when they are used as creping assistants. Frequently, water-soluble inorganic phosphates are used as additional anchoring agents.

In the process disclosed in EP-A-0 856 083 for the creping of paper, epichlorohydrin-crosslinked, water-soluble, thermally noncurable polyamidoamines or modified polyamidoamines in the form of aqueous solutions are applied directly as adhesion promoters to the surface of a creping drum.

The adhesion promoters disclosed in U.S. Pat. No. 5,602, 209 for the creping of paper comprise from 1 to 25% by weight of polyoxazoline and a polyamidoamine-epichlorohydrin resin. Polyoxazoline can, however, also be combined with other polymers, for example polyvinylamides, polyvinyl alcohols, glyoxylated polyvinylamides, polyethylene oxide, polyethyleneimine, polyvinylpyrrolidone and Carbowax® polyethylene glycols. As is evident from the examples, efficiency of combinations of polyoxazoline and a polyamidoamine is higher than the efficiency of the individual polymers.

It is the object of the present invention to provide further adhesion promoters for the creping of paper.

This object is achieved, according to the invention, by a process for the production of crepe paper by adhesive bonding of a paper web with the aid of an organic synthetic polymer or mixtures comprising said polymer to a creping cylinder, compression and removal of the crepe paper from the creping cylinder, if the organic synthetic polymer used is (i) polyethyleneimine having a molar mass $M_w$ of from 50 000 to 2 million,
(ii) reaction products of polyethyleneimine having a molar mass $M_w$ of from 500 to 1 million with at least one $C_{14}$- to $C_{22}$-alkyldiketene, a monocarboxylic acid, an ester of a monocarboxylic acid or an acid chloride of a monocarboxylic acid and
(iii) reaction products of polyalkylenepolyamines having a molar mass of from 300 to 1 million with at least one bischlorohydrin ether or bisglycidyl ether of a polyalkylene glycol having a molecular weight $M_N$ of from 300 to 3000.

Polyethyleneimines (i) are known compounds, cf. O. C. Dermer and G. E. Ham, Ethyleneimine and other Aziridines, Academic Press, New York and London, 1969. They are prepared by polymerization of ethyleneimine in an aqueous medium in the presence of acidic catalysts, such as sulfuric acid, hydrochloric acid or phosphoric acid, and of Lewis acids or of compounds which eliminate an acid, for example halogenated hydrocarbons, such as methyl chloride, ethyl chloride, chloroform, carbon tetrachloric, ethylene chloride, tetrachloroethylene or bromomethane. Polyethyleneimine has long been used in papermaking. In order, for example, to provide paper with wet strength properties, polyethyleneimine is added to the paper stock during papermaking. High molecular weight polyethyleneimine can also be used in papermaking as a retention aid and drainage aid in papermaking. According to the invention, polyethyleneimine having a molar mass $M_w$ of from 50 000 to 2 million, preferably from 200 000 to 1 million, is used as a creping assistants. For this purpose, it is applied to a creping cylinder, for example, in the simplest case, by spraying on an aqueous polyethyleneimine-comprising solution or by treating a dry paper sheet with such an aqueous polyethyleneimine solution, which sheet is then creped.

The adhesive strength of the polyethyleneimines on the moist paper sheet and the creping cylinder generally increases with increasing molecular weight of the polyethyleneimines. If the surface with a specific cylinder material should become too tacky as a result of the polyethyleneimine just used, the tack can be reduced by using a polyethyleneimine having a lower molecular weight. On the other hand, if the adhesion of the paper on the cylinder is too weak, it can be increased by using a polyethyleneimine having a higher molecular weight. A further control of quantity for the adhesion of the paper on the cylinder during the creping process is the type and degree of modification of polyethyleneimine, the exact prediction not being possible owing to the large number of variables. The polyethyleneimines to be used according to the invention as creping assistants and the modified polyethyleneimines which are also suitable are preferably used in the form of their salts. In the latter case, chloride, sulfate, formate and acetate are the preferred anions. The use of salts of the polyethyleneimine with formic acid and having a molecular weight $M_w$ of from 200 000 to 1 million is particularly preferred. Modified polyethyleneimines (ii) suitable as creping assistants are reaction products of polyethyleneimine having a molar mass $M_w$ of 500 to 1 million with at least one $C_{14}$- to $C_{22}$-alkyldiketene, a monocarboxylic acid, an ester of a monocarboxylic acid or an acid chloride of a monocarboxylic acid. These reaction products are substantially uncrosslinked, partially or completely amidated polyethyleneimines. The reaction involves amidation of primary or secondary NH groups in the polyethyleneimine and no linkage of polyethyleneimine molecules. Products of this type are disclosed, for example, in WO-A-94/12560 and WO-A-98/50630. Whereas, according to the prior art, they are added as fixing agents to a paper stock containing interfering substances, prior to sheet formation, they are used according to the invention as creping assistants. They are prepared by reacting polyethyleneimine with alkyldiketenes, such as stearyldiketene, palmityldiketene, behenyldiketene and/or oleyldiketene, in an aqueous medium at temperatures of, for example, from 20 to 100° C., preferably from 40 to 70° C., for example 1 part by weight of polyethyleneimine being reacted with from 0.001 to 0.05, preferably from 0.002 to 0.02, part by weight of at least one alkyldiketene. Instead of alkyldiketenes, at least one $C_1$- to $C_{22}$-monocarboxylic acid, at least one ester of such a monocarboxylic acid with a monohydric $C_1$- to $C_{22}$-alcohol or at least one acid chloride of a $C_1$- to $C_{22}$-monocarboxylic acid, can be used. The polyethyleneimines can be used both in the form of free bases and as salts with mineral acids or organic acids. Preferably used assistants (ii) are reaction products of polyethyleneimine having a molar mass $M_w$ of from 500 to 1 million with at least one $C_{14}$- to $C_{22}$-alkyldiketene.

Suitable creping assistants (iii) are reaction products of polyalkylenepolyamines, preferably polyethyleneimines, having a molar mass of from 300 to 1 million, with at least one bischlorohydrin ether or bisglycidyl ether of a polyalkylene glycol having a molecular weight $M_N$ of from 300 to 3000. The reaction is effected in aqueous solution at temperatures of up to 100° C., preferably from 70 to 95° C. For example, from 0.005 to 0.10, preferably from 0.01 to 0.05, part by weight of bischlorohydrin ether or bisglycidyl ether is used per part by weight of polyalkylenepolyamine. Such reaction products are disclosed, for example, in DE-A-24 36 386. The preferred polyalkylenepolyamine is polyethyleneimine having a molecular weight $M_w$ of from 500 to 750 000. The polyalkylene glycols are preferably derived from polyethylene glycols having a molecular weight $M_N$ of from 300 to 3000, in particular from 500 to 1750. Instead of polyethylene glycol, block copolymers of ethylene glycol and propylene glycol can also be used as the polyalkylene glycols. The polyalkylene glycols are, for example, converted in the corresponding bischlorohydrin ethers or bisglycidyl compounds by reaction with epichlorohydrin in a molar ratio of at least 1:2. The condensates (iii) of polyalkylenepolyamines and at least one bischlorohydrin ether or bisglycidyl ether of polyalkylene glycols have, for example, molar masses $M_w$ of from 100 000 to 4 million, preferably from 300 000 to 3 million. In the case of the modified polyethyleneimines, too, the polymers having a higher molar mass have the higher adhesive power compared to the polymers having a lower molar mass.

The adhesives described above, which are used according to the invention as creping assistants, are usually used in from 0.5 to 15, in general from 2 to 5, % strength by weight aqueous solutions or mixtures. The commercial products, which have a polymer concentration of, for example, from 15 to 25% by weight, are diluted by adding water before being used as adhesives in the creping process or incorporated into the mixtures. The pH of the ready-to-use aqueous polymer solutions is, for example, from 4 to 12, preferably from 6 to 9.

The invention also relates to the use of
(i) polyethyleneimine having a molar mass $M_w$ of from 50 000 to 2 million,
(ii) reaction products of polyethyleneimine having a molar mass of $M_w$ of from 500 to 1 million with at least one $C_{14}$- to $C_{22}$-alkyldiketene, a monocarboxylic acid, an ester of a monocarboxylic acid or an acid chloride of a monocarboxylic acid and/or
(iii) reaction products of polyalkylenepolyamines having a molar mass of from 300 to 1 million with at least one bischlorohydrin ether or bisglycidyl ether of a polyalkylene glycol having a molecular weight $M_N$ of from 300 to 3000 as creping assistants.

The adhesives to be used according to the invention are used not only as individual components but also in mixtures with one another. However, they can also be mixed in mixtures with known adhesives, such as, for example, with the abovementioned polyvinyl alcohols, copolymers of ethylene and vinyl acetate, polyvinyl acetate, polyamidoamines, poly(meth)acrylates and polyacrylic acids and polymethacrylic acids, and with further additives, provided that the products are compatible in the mixtures and do not mutually coagulate. The mixture of the adhesives according to the invention and their mixtures with release agents for better control of the adhesion on the creping cylinder is also possible, as is the mixing in of an additional adhesion promoter.

The polymers (i) to (iii) to be used according to the invention as creping assistants can, for example, be sprayed onto the wet paper web within the papermaking process or applied to the creping cylinders. However, it is also possible to subject a dried paper subsequently to a creping process. For this purpose, the dry paper is either first moistened with water (for example to a moisture content of from about 5 to 20% by weight) or sprayed directly with an aqueous solution of an adhesion promoter (i) to (iii), which solution is to be used according to the invention. Preferably, for example in modern TAD machines, the paper is applied in the dry state to the cylinder, which in turn is sprayed with the adhesive. The amount applied may be, for example, between 2 mg and 250 mg, preferably between 2 mg and 50 mg, per square meter of paper. The temperature of the creping cylinder is, for example, from 100 to 150° C., in general from 125 to 145° C.

The adhesives (i) to (iii) described above can be used as creping assistants either alone or as a mixture with one another. However, it is also possible to use them as a mixture with known creping assistants. Such mixtures may comprise, for example, from 10 to 90, preferably from 20 to 70, % by weight of at least one of the following polymers: polyvinyl alcohol, copolymers of ethylene and vinyl acetate, polyvinyl acetate, polyamidoamines, polyacrylates, polymethacrylates, polyacrylic acid and polymethacrylic acid. Said polymers and, if appropriate, further additives, such as release agents or anchoring agents, should be tested before the preparation of the mixtures with regard to their compatibility with the adhesives to be used according to the invention, so that the components of the mixture do not mutually coagulate. Suitable release agents are, for example, mineral oils and surface-active compounds, which additionally have a plasticizing effect on the paper. Anchoring agents are, for example, water-insoluble inorganic phosphates.

The stated percentages in the examples are percent by weight.

EXAMPLE 1

Crepe lavatory paper having a basis weight of about 25 g/m$^2$ and based on deinked wastepaper was produced on a paper machine. 0.35 g, per square meter of paper, of a 10% strength aqueous solution of a reaction product, neutralized with formic acid, of polyethyleneimine having a molar mass $M_w$ of 600 000 with a bischlorohydrin ether having a molar mass $M_N$ of 1500 is sprayed as an adhesive continuously onto the creping cylinder with the aid of a spray bar. The creping of the paper took place without problems. In the observation period of two days, no troublesome deposits or no signs at all of pitting were discovered on the creping cylinder. Measurable traces of organic chlorine compounds which originated from the wastepaper used were scarcely found in the wastewater.

COMPARATIVE EXAMPLE 1

Example 1 was repeated with the only exception that in this case 0.35 g of a 10% strength aqueous solution of a polyamidoamine/epichlorohydrin resin (Luresin® KNU from BASF Aktiengesellschaft), known as a wet strength agent, was sprayed as an adhesive onto the creping cylinder with the aid of a spray bar. Troublesome deposits formed on the creping cylinder after only a short time so that the paper production had to be interrupted and the creping cylinder reground. Moreover, organic chlorine compounds entered the water circulation of the paper machine through the recycling of the broke, of the edge trimmings and other processing residues.

We claim:

1. A process for the production of crepe paper, the process comprising:
   adhesive bonding of a paper web with the aid of an organic synthetic polymer as an adhesive to a creping cylinder, and
   compressing and removing the crepe paper from the creping cylinder, wherein the organic synthetic polymer is selected from the group consisting of:
   (i) reaction products of polyethyleneimine having a molar mass $M_w$ of from 500 to 1 million with at least one $C_{14}$- to $C_{22}$-alkyldiketene, a monocarboxylic acid, an ester of a monocarboxylic acid or an acid chloride of a monocarboxylic acid, and
   (ii) reaction products of polyalkylenepolyamines having a molar mass of from 300 to 1 million with at least one bischlorohydrin ether or bisglycidyl ether of a polyalkylene glycol having a molecular weight $M_N$ of from 300 to 3000.

2. The process according to claim 1, wherein reaction products of polyethyleneimine having a molar mass $M_w$ of from 500 to 1 million with the at least one $C_{14}$- to $C_{22}$-alkyldiketene are used as the adhesive (i).

3. The process according to claim 1, wherein reaction products of 1 part by weight of polyethyleneimine having a molar mass $M_w$ of from 500 to 1 million with from 0.001 to 0.05 part by weight of the at least one $C_{14}$- to $C_{22}$-alkyldiketene are used as the adhesive (i).

4. The process according to claim 1, wherein reaction products of polyalkylenepolyamines having a molar mass of from 300 to 1 million with the at least one bischlorohydrin ether or bisglycidyl ether of the polyalkylene glycol having a molecular weight $M_N$ of from 300 to 3000 are used as the adhesive (ii).

5. The process according to claim 4, wherein the polyalkylenepolyamines are polyethyleneimines.

6. The process according to claim 1, wherein reaction products of polyalkylenepolyamines having a molar mass of from 300 to 1 million with the at least one bischlorohydrin ether or bisglycidyl ether of the polyethylene glycol having a molecular weight $M_N$ of from 500 to 1750 are used as the adhesive (ii).

7. The process according to claim 6, wherein the polyalkylenepolyamines are polyethyleneimines.

8. The process according to claim 1, wherein the adhesives (i) and/or (ii) are used in a mixture with at least one organic synthetic polymer selected from the group consisting of polyvinyl alcohols, copolymers of ethylene and vinyl acetate, polyvinyl acetate, polyamidoamines, poly(meth)acrylates and polyacrylic acids and polymethacrylic acids.

9. The process according to claim 1, wherein the adhesives comprise a release agent.

10. The process according to claim 1, wherein from 2 to 250 mg of at least one the adhesive (i) and/or (ii) are used per square meter of paper.

* * * * *